United States Patent [19]

Malik et al.

[11] Patent Number: 5,724,409
[45] Date of Patent: Mar. 3, 1998

[54] SPEED FORWARDING SYSTEM FOR PERSONAL NUMBER COMMUNICATIONS SYSTEM

[75] Inventors: Dale W. Malik, Dunwoody; Sonu Mirchandani, Norcross, both of Ga.

[73] Assignee: BellSouth Corporation, Atlanta, Ga.

[21] Appl. No.: 268,805

[22] Filed: Jun. 30, 1994

[51] Int. Cl.⁶ .................................................. H04M 1/64
[52] U.S. Cl. ................... 379/88; 379/210; 379/211; 379/212; 379/207; 379/230; 379/142
[58] Field of Search ........................ 379/67, 88, 89, 379/142, 210, 211, 212, 245, 207, 230

[56] References Cited

U.S. PATENT DOCUMENTS

| | | | |
|---|---|---|---|
| 4,313,035 | 1/1982 | Jordan et al. | 379/211 |
| 5,222,125 | 6/1993 | Creswell et al. | 379/67 |
| 5,247,571 | 9/1993 | Kay et al. | 379/207 |
| 5,309,504 | 5/1994 | Morganstein | 379/67 |
| 5,375,161 | 12/1994 | Fuller et al. | 379/211 |

*Primary Examiner*—Fan S. Tsang
*Attorney, Agent, or Firm*—Jones & Askew

[57] ABSTRACT

A method for a subscriber having a personal number to forward calls to a selected calling line. A communication directed to a predetermined number is received, and the calling line identification number (CLID) from which the call originated is obtained, as well as any extra digits entered by the subscriber. (80) The CLID is matched in a table to determine the subscriber associated with the CLID. (81) If no matches are found, the call is disconnected. (83) If more than one match is found, additional information is obtained to identify the desired subscriber. (85) Once the subscriber has been identified, a pointer is updated. (84) The pointer specifies the location (CLID) to which the calls are to be routed. Calls for that subscriber at his or her personal number are then forwarded to the calling line having that CLID.

8 Claims, 6 Drawing Sheets

SPEED FORWARDING SYSTEM FOR PERSONAL NUMBER COMMUNICATIONS SYSTEM

TECHNICAL FIELD

The present invention generally relates to forwarding of telephone calls to a subscriber-selected location and more particularly relates to an improved method of updating the routing of incoming telephone calls in a personal number communications system.

BACKGROUND OF THE INVENTION

The demand for portable communications makes it one of the fastest growing segments of the telecommunications industry. Over the last decade, cellular radio and cordless telephones have gained wide acceptance, and paging services and other forms of portable communications services continue to gain popularity.

The most recent concept in portable communications involves "Personal Communications Services" (PCS), particularly those advanced services that are based upon person-to-person rather than station-to-station communications. Personal Communications Services is a broad term used to generally describe a wide range of wireless and wireline communications technologies that free users from the constraints of the wireline public switched telephone network, and enable them to communicate when they are away from their home or office telephone.

Conventional communications systems are station-to-station and therefore require that individuals have a different telephone instrument and telephone number for their homes, offices and cars. The advent of "personal number communications systems" (PNCS) represents a new era in communications. A personal number communications system, such as the one disclosed in U.S. patent application Ser. No. 07/936,384, filed Aug. 26, 1992, and titled "Personal Number Communications System", abandoned, refiled as continuation application Ser. No. 08/469,491 on Jun. 6, 1995, and which is incorporated herein by reference, permits subscribers to be reached at any time in any place using a single telephone number. The system receives communication routing information from each subscriber in the form of one or more hierarchical lists of destinations based on the time of day, day of the week, or subscriber override options. Any communication directed to a subscriber's personal number is received by the PNCS system and is routed according to the subscriber's destination list. The system will initially route the call to the first destination in the hierarchical list of destinations. If there is no response from the called party at the first destination, the system then routes the call to the next destination in the destination list according to the hierarchy selected by the subscriber. The system continues to sequentially route the call according to the destination list until the communication is accepted or until the last destination on the destination list is reached, typically a voice mail service or an answering service.

A primary feature of a personal number communications system is the ability of the subscriber to change the hierarchy or composition of the destination list, including the ability to override the destination list to direct communications to a specific destination. Current methods of implementing this feature require manual "registration" of the new routing information. In particular, the system requires the subscriber to place a call to the PNCS system and access an administrative interface or menu. The subscriber is then typically required to manually enter a sequence of digits in order to modify the routing of his or her calls. When one considers the possible scenario of having to enter a seven digit PNCS number, followed by a personal identification number (PIN), followed by several digits in response to menu prompts to reach the desired routing menu, followed by a seven to ten digit telephone number for the new destination, and followed by several more digits to confirm the telephone number and exit the system, it will be appreciated that the conventional method of registering updates to the PNCS server in order to forward telephone calls can be an extremely time consuming and inefficient process.

The current method of performing manual forwarding of personal number calls also suffers from other shortcomings. From a network perspective, the primary disadvantage is that an actual call to the PNCS platform is required. The PNCS operates on an adjunct processor called the service circuit node (SCN), which performs all administrative functions in the network. Because subscribers to a personal number communications service may move their calls around multiple times a day, manual registration of personal number calls places a heavy burden on the expensive and limited resources of the SCN.

Therefore, there is a need in the art for a method of registering updates in a PNCS system that allows subscribers to quickly and easily change the routing of their personal number calls and that does not require the placement of a call to the SCN.

SUMMARY OF THE INVENTION

As will be seen, the present invention satisfies the foregoing need. Stated generally, the present invention provides a method of quickly and easily updating the routing of calls in a personal number communications service that does not require the placement of a call to the SCN. Although the discussion herein is directed to an invention for use with a Personal Number Communication System, the invention is also useful for routing of any type of telephone call to a location selected by the subscriber.

More particularly, the present invention provides a method that allows customers of a personal number communications system to have calls to their personal number forwarded to a selected calling line. The method comprises receiving a communication that is directed to a predetermined number. Next, the calling line identification number (CLID) will be obtained from the communication, thereby identifying the calling line from which the communication originated. The CLID is then searched for in a table in order to identify the particular customer that is associated with that CLID. Finally, calls for that customer at his or her personal number are forwarded to the calling line that is associated with the CLID. The predetermined number may be a conventional telephone number or a special number, such as *41, for example.

In another aspect of the invention, the customer may enter one of a plurality of different predetermined numbers to initiate the communication. In this case, a different predetermined number will be assigned for different locations for which the customer may preload its corresponding telephone number, for example, HOME, OFFICE, or CAR.

In some instances, it will not be possible to determine which customer has initiated the communication based on the CLID alone. This may occur, for example, if more than one customer (such as a husband and wife) both have preloaded the same HOME telephone number as a possible forwarding destination. In these cases, the customer must enter a personal identification number (PIN), unique to that subscriber. The customer may enter his or her PIN initially, or the system will play a message directing the customer to enter the PIN. Thereafter, it will be possible to identify the customer based on the CLID and the PIN, and calls for that customer will be forwarded to the calling line associated with the CLID.

There may be some instances in which the CLID will not be recognized, for example if the customer is calling from a location other than those preloaded into the system. In these cases, the customer will be required to enter his or her personal number in addition to the PIN, thereby allowing the system to identify which customer is requesting the forwarding operation. Again, the customer may enter his or her personal number initially, or the system may play a message directing the customer to enter the personal number.

In still other cases, the CLID will not be communicated automatically, for example, in most calls originating from a mobile telephone. In these cases, the customer must enter the CLID in addition to his or her personal number and PIN, thereby allowing the system to identify which customer has initiated the forwarding operation. The customer may enter his or her personal number initially, or the system may play a message directing the customer to enter this information. Likewise, the customer may enter the CLID initially, or the system may play a message directing the customer to enter the CLID.

Therefore, the present invention provides a simplified method for a personal number communications system customer to change the routing of calls to his or her personal number. In the simplest case, a customer at a location at which he or she wants to have personal number calls forwarded will simply dial a predetermined number only and hang up. In certain scenarios, the customer may accomplish the same function by additionally dialing a PIN and/or his or her personal number.

In another aspect of the invention, an apparatus is provided for connecting an originating call for a personal number (PN) of a subscriber to a calling line selected by the subscriber. The apparatus comprises a plurality of service switching points (SSPs) which are each connected to a plurality of calling lines. Each calling line has a calling line identification number (CLID). When the subscriber places an update call, i.e., to have calls for his or her personal number forwarded to a selected calling line, each SSP determines the CLID for the update call and provides notice of the update call. When an originating call is placed to the personal number, the SSP that is associated with the selected calling line receives the originating call and the call routing information for the originating call, and relays the call and the routing information in accordance with call routing instructions. When a relayed originating call and relayed call routing information are received, the SSP connects the relayed call to a calling line having the CLID specified in the relayed call routing information.

A service control point (SCP) is also functionally connected to the plurality of SSP's. The SCP contains a call routing table which contains the call routing information. When an SSP provides notice of an update call, the SCP responds by updating the call routing information so as to route calls for the personal number to the CLID associated with the update call, i.e., to the new location selected by the subscriber.

DETAILED DESCRIPTION OF THE PREFERRED EMBODIMENTS

Figure 1:
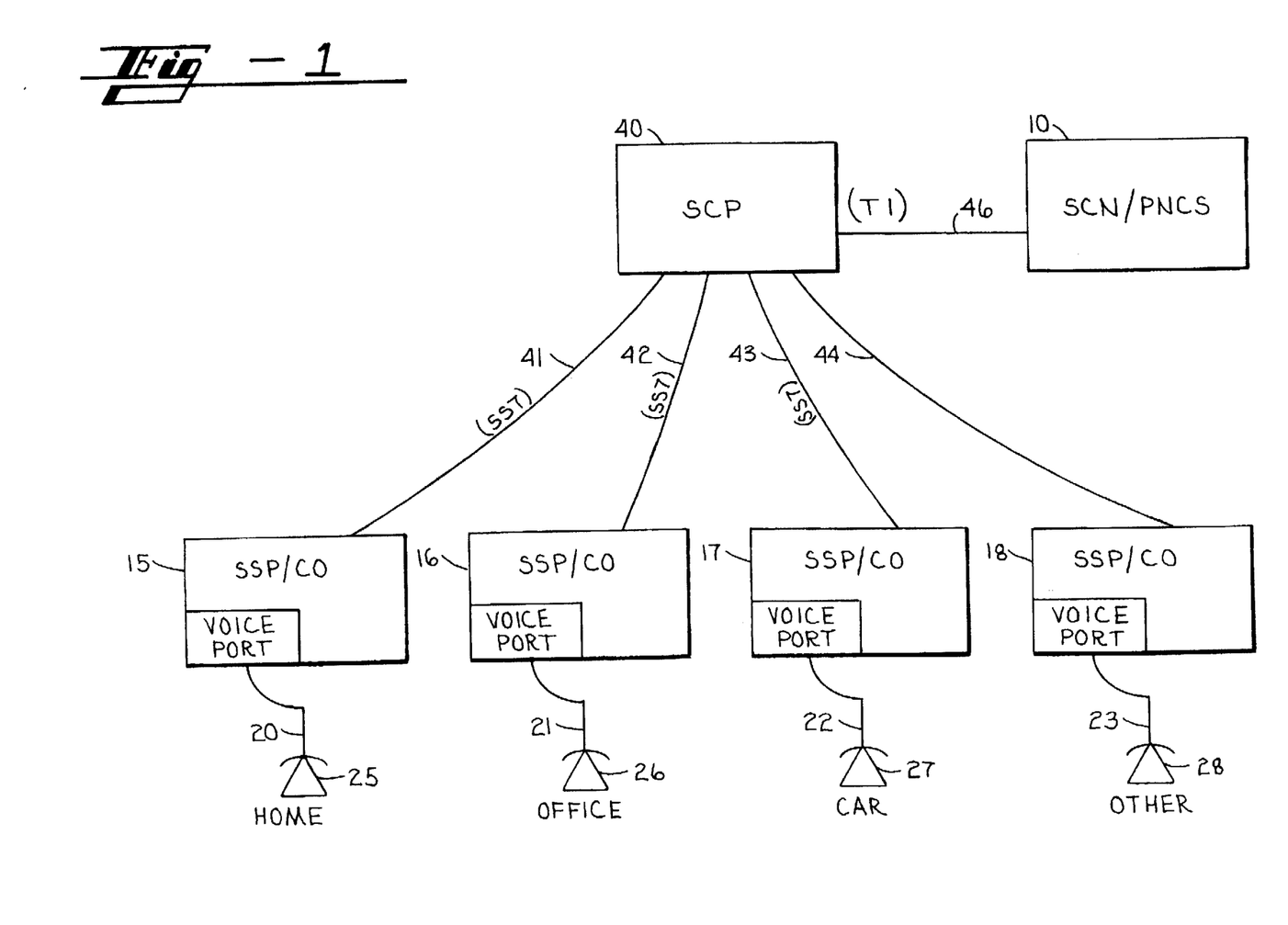
FIG. 1 is a block diagram illustrating the preferred environment of the present invention.

Turning now to the drawing figures in which like numbers reference like elements throughout the several figures, FIG. 1 is a block diagram illustrating the preferred environment of the present invention, which includes an improved method for updating the routing of personal number calls in a personal number communications system (PNCS) 10. In the preferred embodiment, the PNCS 10 is the Personal Number Communications System disclosed in the above-mentioned patent application.

The PNCS 10 operates on a network platform such as a service circuit node (SCN), which is interfaced with the public switched telephone network comprising one or more tandem offices and/or end offices 15–18. In the preferred embodiment, the service circuit node 10 is the BellSouth A-I-Net Service Circuit Node Model 250, available from AT&T Network Systems.

The network architecture of the modern public switched telephone network is commonly referred to as the Advanced Intelligence Network (AIN). This network architecture is used by all modern telephone switching systems in the United States, as well as by many systems in western Europe and Japan. The Advanced Intelligence Network supports and is controlled by a form of common channel interoffice signaling, in which information about a telephone call (e.g., the identity of the called number) is transmitted over high speed data links that are separate from the circuits that are used to transmit the voice signals of the call. The AIN architecture uses the same signaling path to provide enhanced custom calling features and to control the operation of billing equipment.

Referring to FIG. 1, several components of the AIN, well known to those skilled in the art, are shown. The public switched telephone network typically comprises a plurality of central office switches, indicated as Service Switching Point/Central Offices (SSP/CO) 15, 16, 17, 18. The SSP/CO switches include appropriate hardware and software for compatibility with the AIN.

Each SSP/CO 15, 16, 17, 18 has a plurality of subscriber lines connected thereto. Typically, the number of subscriber lines will be on the order of 10,000 to 70,000 lines per central office. For clarity of illustration, only subscriber lines 20, 21, 22, 23 are shown. Each of the subscriber lines 20, 21, 22, 23 is connected to a terminating piece of customer premises equipment that is represented by a plurality of telephone sets 25, 26, 27, 28, respectively, for each of the switches. In the example shown in FIG. 1, the telephone sets 25, 26, 27, and 28 correspond to locations designated HOME, OFFICE, CAR and OTHER, respectively. Car telephone 27 is shown, for ease of illustration, as being connected to SSP/CO 17 via line 22. It will be appreciated that, in fact, SSP/CO is connected to a mobile switching center (MSC), not shown, which is in radio contact with car telephone 27.

While FIG. 1 illustrates each location HOME, OFFICE, CAR and OTHER as being served by separate central offices 15, 16, 17 and 18 respectively, it will be understood and appreciated by those skilled in the art that any one central office could serve multiple locations, including any or all of the four locations shown in the drawings.

Also, a local service control point (SCP) 40 is functionally connected to the SSP/CO 15, 16, 17, 18 via respective communication channels 41, 42, 43, 44. In the preferred embodiment, these communication channels are 56 kb/s bidirectional data links, employing a signaling protocol referred to as Signaling System 7 (SS7). The SS7 protocol is well known to those skilled in the art and is described in a specification published by the American National Standards Institute (ANSI). The SS7 protocol is a layered protocol wherein each layer provides certain services for layers above it and relies on other services provided by the layers below it.

Among the functions performed by the service control point 40 is the maintenance of network databases used in providing enhanced services. Service control points, such as the SCP 40, are physically implemented by powerful fault tolerant computers, such as the Star Server FT Model 3200 or Model 3300, both sold by AT&T. These computers typically accommodate between one to twenty seven disk drives ranging from 300 megabytes to 1.2 gigabytes per drive, and have main memory on the order of 24 to 192 megabytes. In practice, service control points are generally provided in redundant mated pairs in order to ensure reliability. For simplicity, these redundant pairs have not been shown in the drawing.

The SCN/PNCS 10 is connected to the SCP 40 via communications channel 46. In the preferred embodiment, communications channel 46 is a T-1 private line data link using an X.25 protocol. The T-1 data link and X.25 protocol are well known to those skilled in the art.

In a personal number communications system 10, such as the system described in the above-mentioned patent application, a personal number is assigned to each subscriber. The PNCS system 10 stores communications routing information from each subscriber in the form of one or more hierarchical lists of destinations based upon the time of day, day of the week, or subscriber override options. Thus, any communication directed to a subscriber's personal number is initially directed to the first destination on the hierarchical list. If there is no response from the called party at the first destination, the communication will be directed to the second destination in the destination list. The system continues to route the incoming call according to the destination list until either the call is accepted, or a final destination is reached, which is typically a voice mail service or an answering service.

Under current PNCS services, a subscriber may update the routing of his or her calls by changing the hierarchy and composition of the destination lists. Typical implementations of this feature require the subscriber to place a call to the PNCS server 10 (by dialing his or her personal number) and accessing an administrative interface or menu. By entering a successive series of digits in response to a sequence of menu prompts, the subscriber may access a call routing menu that allows the subscriber to modify the routing of his or her personal number calls. Typically, the procedure for modifying the destination list requires the subscriber to manually "register" a new telephone number to which telephone calls to the personal number should be forwarded. Alternatively, a voice response system may be used in which a subscriber can verbally provide the updated routing information.

Referring to FIG. 1, the conventional method of performing manual forwarding of personal number calls will be illustrated for a hypothetical subscriber at location OFFICE, i.e., the PNCS subscriber wishes to update his or her PNCS routing information to direct all calls to his or her office. First, the subscriber is required to call the PNCS server 10 by dialing his or her personal number. The local SSP/CO 16 would route the call via a voice link to the PNCS platform 10.

While the call is connected to the PNCS server 10, the subscriber may then modify the routing of personal number calls by following a sequential administrative menu. Typically, this involves the manual entry of a series of digits in response to several prompts from the PNCS 10, which necessarily requires that a telephone line be dedicated to handling the call during this process.

Thus, conventional call routing systems require that the subscriber call into the same system that provides the service and provide the system with instructions on how to route calls. In AIN systems, the service circuit node (SCN) performs all administrative functions and responds to calls for updating the routing information. Calling the SCN for purely administrative functions places an extra burden on the serving system, particularly given the fact that a subscriber may update his or her routing information multiple times a day. This burden is compounded by the fact that the SCN's handling of administrative functions ties up both the communication lines and the platform during the length of the call, which prevents the SCN from handling other functions, in particular those functions that produce revenue to the PNCS provider.

The present invention provides a more economical and efficient method of updating the routing of personal number calls by off-loading certain administrative functions to other network elements that can more efficiently handle those functions. Furthermore, it receives the updates from the subscribers and delivers the updates to the SCN/PNCS 10 via data links, rather than the voice links required for a conventional telephone call. Finally, it significantly reduces the amount of processor and telephone line time required to update the routing of calls by providing a speed forwarding system for the most frequently used destinations in the PNCS system.

In general terms, the present invention enables each subscriber to a PNCS service to "preload" a plurality of telephone numbers into a subscriber-unique "routing table" that is also stored in the SCP 40 rather than in only the PNCS server 10. The preloaded telephone numbers correspond to certain destinations at which the PNCS subscriber most frequently receives incoming telephone calls. By simply entering an access code, and in some cases identification information, a subscriber can automatically have all incoming calls to his personal number routed to one of the preloaded destinations. The invention thus provides the subscriber with a "speed forwarding" system for changing the routing of his or her calls, without having to actually place a call to the PNCS system.

The operation and methodology of the speed forwarding system will be described in detail below.

Figure 2:
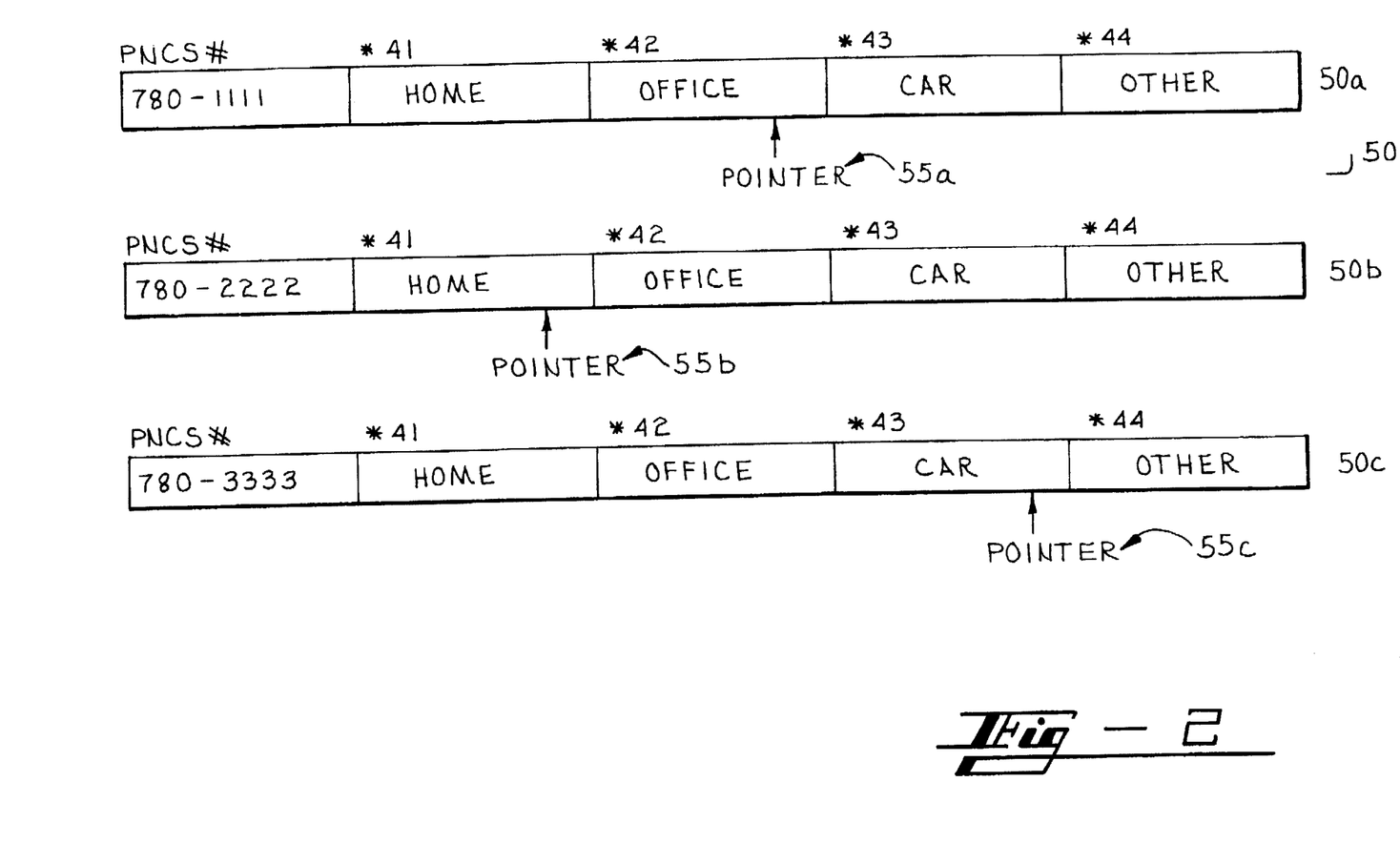
FIG. 2 illustrates several example routing tables stored in the Service Control Point.

For personal number communication services, the SCP 40 maintains unique "routing tables" for each subscriber. These routing tables allow subscribers to "preload" a plurality of telephone numbers that correspond to destinations at which the subscriber is most frequently called. FIG. 2 illustrates several routing tables 50 that are illustrative of the routing tables stored in the SCP 40.

In the preferred embodiment, each routing table 50a–50c is illustrated as having three primary destination entries:

HOME, OFFICE, and CAR. Each table entry contains a telephone number corresponding to the station number for that entry, in this case, home, office, and car telephone numbers, respectively. A subscriber will thus preload the telephone numbers for his or her home, office and automobile into a routing table unique to that subscriber. Typically, these three numbers will change infrequently, if at all. Therefore, in the preferred embodiment, the preloading of these three numbers is done at the PNCS server 10, either by the subscriber or the supplier of the PNCS service, and then the PNCS 10 provides this data to the SCP 40. In addition, there is a fourth destination entry in each routing table 50, OTHER, that corresponds to a station number for a location other than one of the three preloaded destinations, i.e., a location other than HOME, OFFICE, and CAR.

Each routing table 50a–50c further includes a pointer 55a–55c, respectively, which identifies the preloaded destination to which any incoming calls should be directed for the PNCS number at that particular time. Thus, table 50b has its pointer 55b at the destination HOME and indicates that the SCP 40 should direct the SCN 10 to route all incoming calls for that PNCS number to the telephone number stored in the HOME entry for that subscriber. When the SCN 10 is not available for call processing, the SCP 40 will direct calls on behalf of the SCN 10 using the same routing table 50.

While the preferred embodiment designates three specific destinations as the preloaded destinations, it will be understood and appreciated by those skilled in the art that the preloaded destinations need not be limited to three in number, nor to HOME, OFFICE, and CAR. Rather, the present invention specifically contemplates the preloading of destinations that are used, frequently or infrequently, for a particular PNCS subscriber.

Routing table 50a corresponds to a hypothetical subscriber with a PNCS number (a personal number) of 780–1111. The subscriber will preload his or her home telephone number, office telephone number, and car telephone number into the table, and select one of the destinations as the "current" destination, i.e., the destination to which incoming calls should be directed. In routing table 50a, the pointer 55a is directed to the OFFICE destination, indicating that all incoming calls to the personal number 780–1111 will be directed to the preloaded telephone number which the subscriber has designated as corresponding to the OFFICE destination or entry.

Routing table 50b corresponds to a different hypothetical PNCS subscriber with a personal number of 780–2222. In table 50b, the pointer 55b is directed to the HOME destination, indicating that all incoming calls to that personal number will be directed to the preloaded telephone number which the subscriber has designated as corresponding to the HOME destination or entry.

Routing table 50c corresponds to a third hypothetical PNCS subscriber with a personal number of 780–3333. The pointer 55c in this table is directed to the CAR destination, indicating that all incoming calls to that personal number will be directed to the preloaded telephone number which the subscriber has designated as corresponding to the CAR destination or entry.

In order to allow each PNCS subscriber to quickly and easily change the routing of his or her incoming calls and without having to place an actual call to the PNCS server 10, AIN "triggers" are defined at the switches 15–18 for each call. A trigger in the network is an event associated with a particular subscriber line, such as lines 20–23, that generates a packet to be sent to a service control point 40. The trigger causes the service control point 40 to query its database to determine whether some customized calling feature or enhanced service should be implemented for this particular call. A packet of information including instructions on how to process the call is sent back to the switch 15–18 from the service control point 40. With the exception of the particular use specified in the present invention, triggers are, in general, well known in the art.

In the preferred embodiment, one or more triggers or access codes are defined for each preload destination. That is, a PNCS subscriber calling from one of the preloaded destinations simply enters a predefined access code (e.g., *41) and, preferably, for verification, a unique personal identification number (PIN) in order to have incoming calls routed to that destination. The local SSP/CO 15, 16, 17, 18 recognizes the access code as requiring special action, and routes an information packet containing the calling information (including the telephone number of the calling location) via data links 41, 42, 43, 44 to the SCP 40. The SCP 40 then queries its database for instructions on how to process the access code. In contrast, a conventional call to the PNCS server 10 is over a voice link to the PNCS platform 10.

The results of the database query by the SCP 40 indicate that the routing table for the PNCS subscriber (identified by the unique PIN) should be changed so that subsequent incoming calls are routed to the destination corresponding to that access code. Thus, the routing table for that subscriber would be updated by moving the pointer 55 to that destination. The SCP 40 may optionally send the updated routing information to the PNCS platform 10 via data link 46. Sending the information via data links from the SCP 40 to the PNCS server allows updating of the PNCS to be accomplished efficiently and rapidly, as only a limited length of digital data string need be sent. In contrast, a call to the PNCS server requires that a PNCS voice port, and associated voice lines and voice communications links, be dedicated for that call for the full duration of that call.

The preferred embodiment contemplates establishing a separate trigger or access code for each of the three primary preloaded destinations. For example, an access code of *41 may be used for the destination HOME, *42 may be used for the destination OFFICE, and *43 may be used for the destination CAR. However, those skilled in the art will understand and appreciate that the system may also operate by using only one access code for all three destinations. Such an operation could be implemented in several different ways, for example, by providing a list of the three preloaded destinations from which the subscriber could select one, or by taking advantage of the caller identification information (including the telephone number of the calling destination) that may be transmitted to the SCP 40 by the SSP/CO 15–18.

Figure 3:
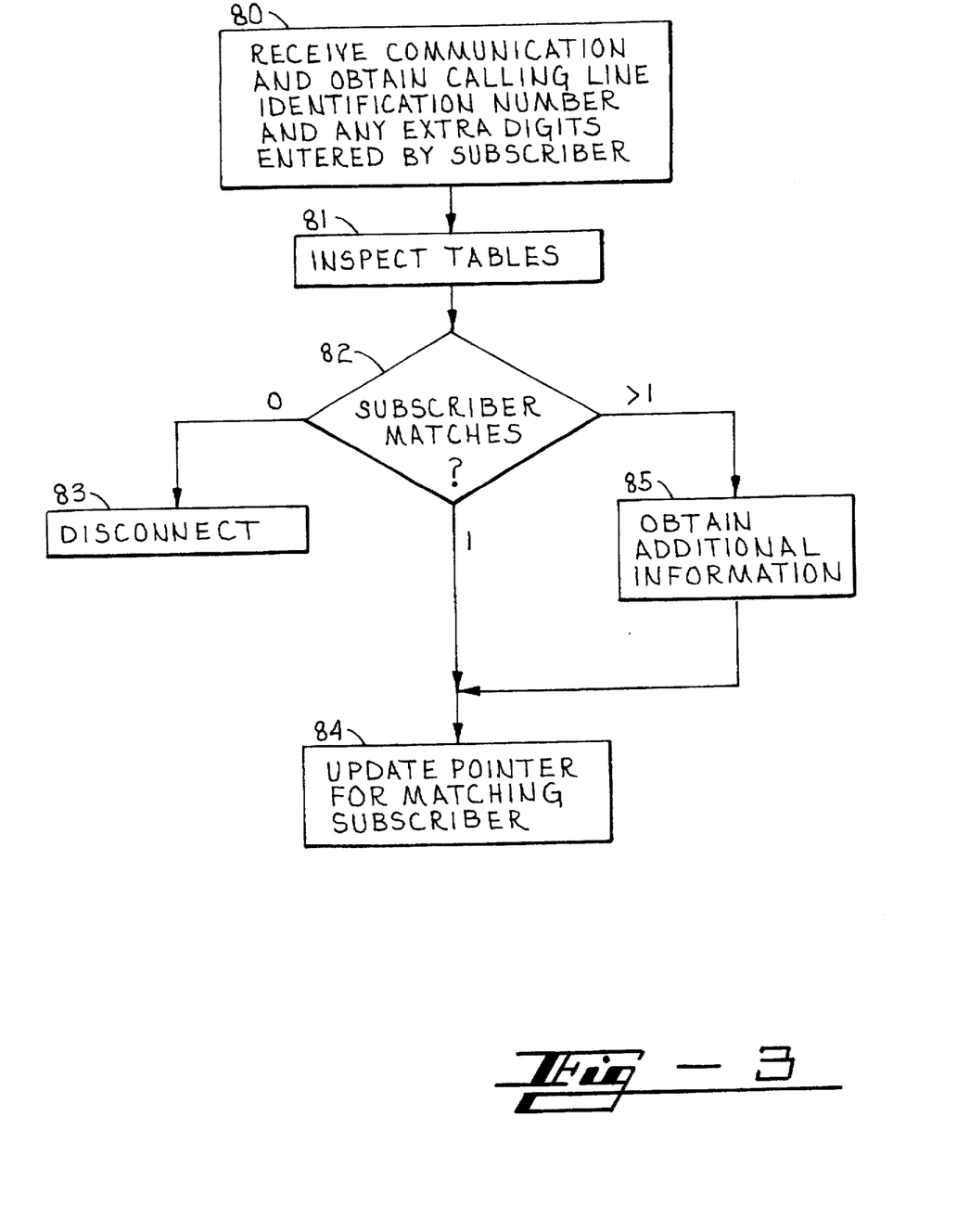
FIG. 3 is a simplified flow chart illustrating the operation of the present invention.

FIG. 3 is a simplified flow chart illustrating the operation of the present invention. At step 80 the SCP 40 receives a communication directed to a predetermined number, such as *41. The SCP 40 preferably also obtains the calling line identification number from which the communication originates and any digits entered by the subscriber, such as a personal number. In step 81 the SCP 40 inspects the routing table for a match for the calling line identification number or the personal number as entered. Preferably, the SCP 40 inspects only those table entries associated with the predetermined number. For example, only HOME table entries for *41, only OFFICE table entries for *42, and so on.

In step 82, the SCP 40 determines the number of matching entries found. If no matching entries are found then, in step 83, the SCP 40 disconnects from the communication. If only one matching entry is found and additional information is not needed then, in step 84, the SCP 40 updates the pointer 55 for the subscriber having the personal number which had the matching entry. If more than one matching entry is found or additional information is needed, such as a calling line identification number, personal number, or personal identification number, then, at step 85, the SCP 40 obtains, if not already provided, and then inspects the additional information needed to identify the subscriber and/or the desired calling lines. The SCP 40 then proceeds to step 84.

Figure 4A:
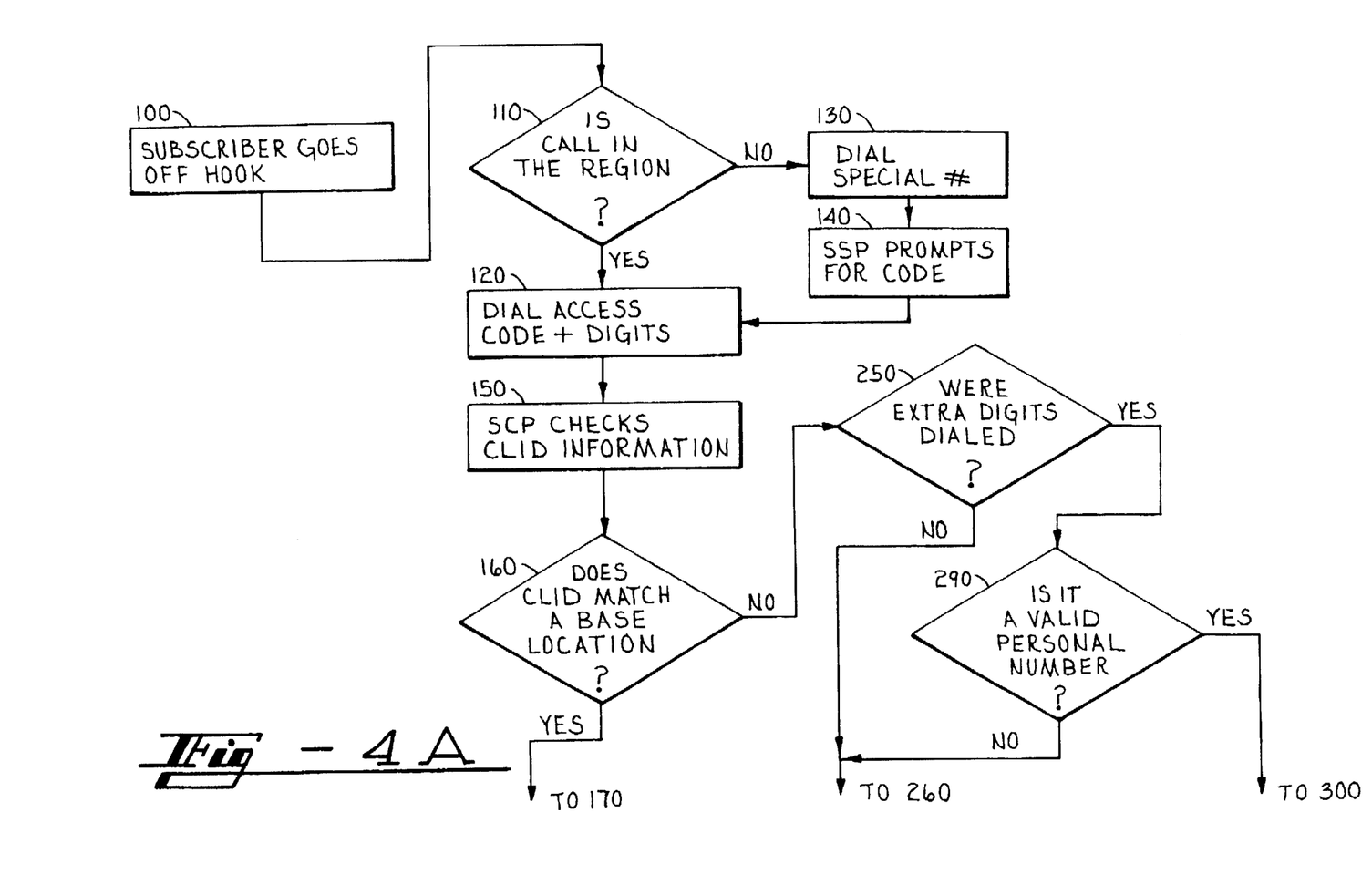
FIGS. 4A–4C are a flow chart illustrating steps of particular methods of operation of the preferred embodiment of the present invention.
Figure 4B:
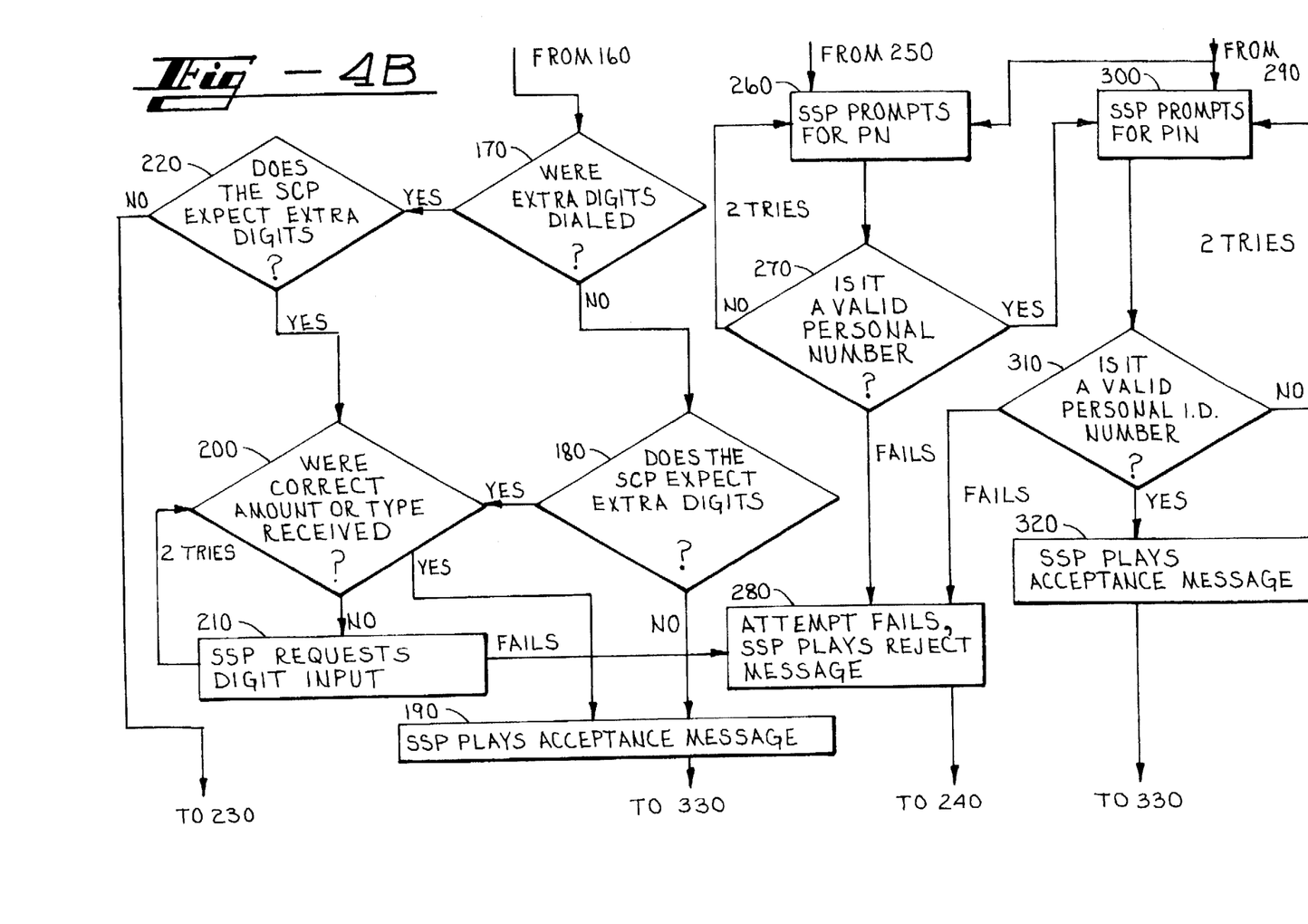
Figure 4C:
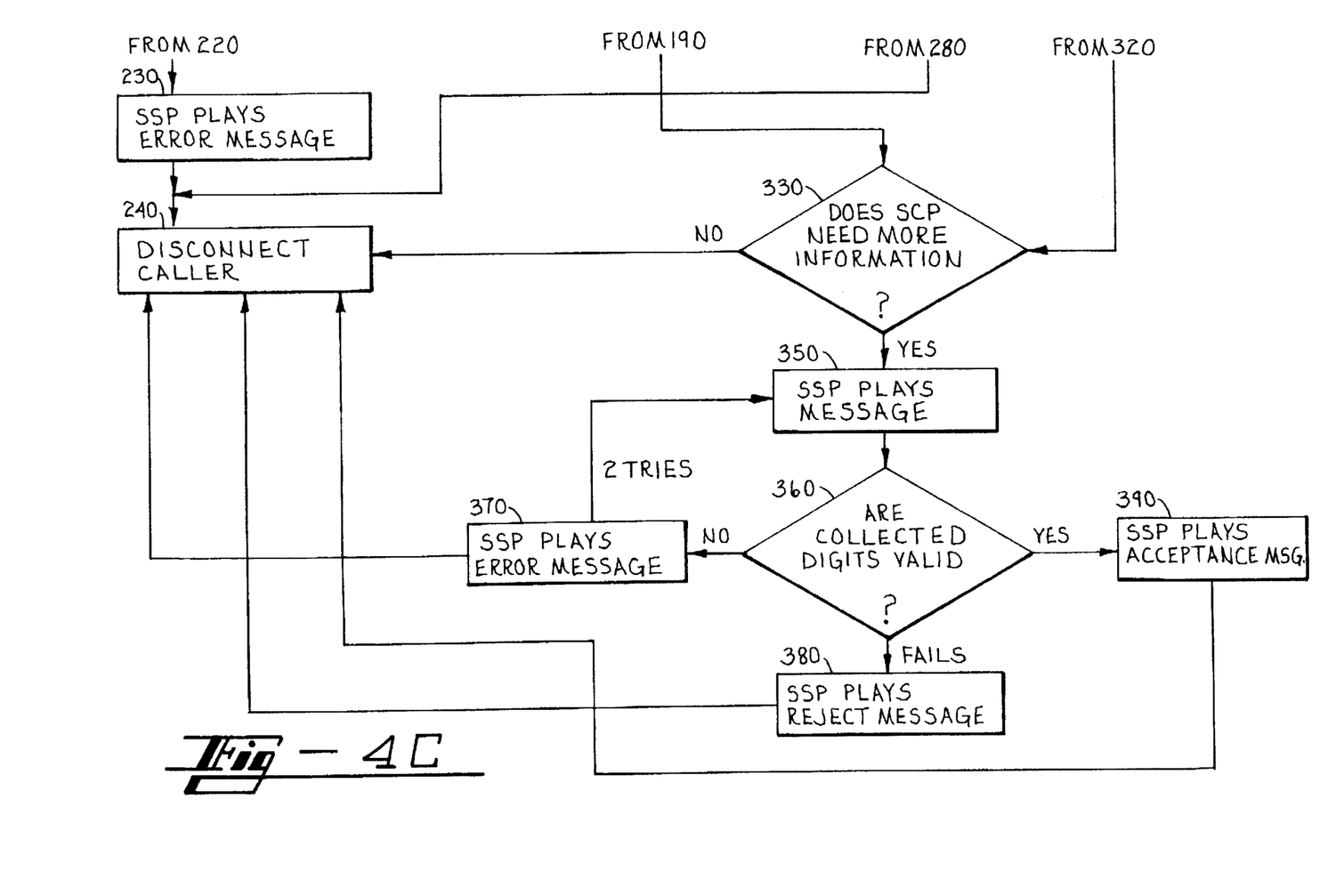

FIGS. 4A-4C are a flow chart illustrating steps of particular methods of operation of the preferred embodiment of the present invention. In step 100, a PNCS subscriber goes "off hook", i.e., picks up the telephone handset and hears a dial tone. At step 110, the subscriber determines whether he or she is within the region serviced by the provider of PNCS services with which the subscriber has contracted.

If the subscriber is within the region then the subscriber at step 120 dials a special access code depending on the location to which he or she wishes PNCS calls to be directed. For example, the subscriber may enter *41 to have calls directed to HOME, *42 to have calls directed to OFFICE, or *43 to have calls directed to CAR. In an alternative embodiment, other access codes, such as *44, *45, etc., may designate OTHER locations.

In step 120 the user may optionally input extra digits, which in the preferred embodiment may comprise a personal identification number (PIN) that uniquely identifies each PNCS subscriber and/or the subscriber's personal number (i.e., the subscriber's PNCS telephone number).

If the call is not within the region, the subscriber must enter a special telephone number at step 130 (e.g., an 800 number) that triggers an SSP within the region. At step 140, the SSP prompts the subscriber for the access code.

The SSP servicing the location from which the subscriber is calling will collect the access code and any other digits dialed by the subscriber. The SSP will then send the access code, any extra digits, and calling line identification information (i.e., the telephone number of the location from which the subscriber is calling) via data links to the SCP 40, which consults its databases for instructions on how to process the access code. Specifically, in step 150 the SCP 40 will search each of its routing tables under the column corresponding to that access code to determine if any telephone numbers match the telephone number of the calling location.

For example, if the subscriber is calling from HOME, he or she would enter the access code for HOME (*41). The SCP would search each of the routing tables under the HOME column for a match of the telephone number from which the subscriber is calling.

In step 160, if the telephone number of the calling location matches a "base location", i.e., if the subscriber is calling from one of the destinations preloaded into one of the HOME entries for the routing tables stored in the SCP (in the preferred embodiment, HOME, OFFICE or CAR), then at step 170 the SCP determines whether extra digits were dialed by the subscriber at step 120. If extra digits were not dialed (i.e., the subscriber entered an access code only), then at step 180 it is determined whether the SCP expected extra digits.

In certain cases, the SCP will not expect extra digits because it will be able to identify the PNCS subscriber by the access code and the calling line identification only. For example, if the subscriber dials access code *41 from his HOME destination, and no other PNCS subscriber has the same telephone number preloaded as a HOME destination, then the SCP will recognize that PNCS subscriber as the calling party, even without the subscriber entering a PIN. If the SCP did not expect and did not receive extra digits, then the SCP will update the subscriber's routing table so that subsequent calls to his or her personal number will be routed to the telephone number from which the call originated (corresponding to the access code entered by the subscriber). In this example, calls will be routed to the subscriber's home telephone number. At step 190 the SCP will send an instruction to the SSP which causes the local SSP to play an acceptance message indicating that the subscriber's calls will be routed to the chosen destination.

There may be instances, however, where the SCP may expect or require extra digits even though the subscriber is calling from a base location. For example, there may be instances where two members of the same family may both be subscribers to a PNCS service, and would therefore have the same HOME telephone number preloaded into their respective routing tables. Likewise, two co-workers may have the same OFFICE telephone number programmed into their respective PNCS routing tables. In these situations, when one of the subscribers at HOME or OFFICE dials the access code corresponding to that location only (e.g., *41 or *42, respectively), the SCP will search all of its routing tables for the telephone number of the calling location. Because there will be multiple entries of that telephone number preloaded into multiple tables, the SCP can not determine which of the PNCS subscribers' routing tables to update.

Therefore, a unique personal identification number (PIN) is provided for each subscriber. Thus, in situations in which a particular telephone number is preloaded into more than one routing table, the SCP will "expect" extra digits to identify the subscriber, i.e., it must be given the PIN to know which routing table to update.

Thus, if in step 180 extra digits were dialed and the SCP did expect extra digits, then at step 200 it is determined if the correct amount or type of digits were received, i.e., whether the SCP recognizes the extra digits as a valid PIN. If the correct amount and type of digits were received, then the SCP will recognize the PIN (and thus the PNCS subscriber that is calling) and therefore update his or her corresponding routing table in accordance with the dialed access code. At step 190, the local SSP will play an acceptance message indicating that the subscriber's personal number calls will be routed to the calling location. The SCP then proceeds to step 330.

If, on the other hand, at step 200 the correct amount or type of extra digits were not received (i.e., the SCP does not recognize the extra digits as a valid PIN), then at step 210 the SCP will send an instruction to the local SSP which will cause the SSP to request the subscriber to reenter the extra digits (PIN). The SCP will again ascertain at step 200 whether a valid sequence of digits was entered. The subscriber will be given two attempts to enter a valid PIN.

If in one of the two attempts the subscriber enters a valid PIN, the SCP will update the appropriate routing table and the local SSP will play an acceptance message at step 190. If, on the other hand, the subscriber does not enter a valid PIN within the two attempts, the updating attempt will fail and, at step 280, the local SSP will play a message indicating that the PIN has been rejected and the routing table has not been updated.

Referring back to step 170, if extra digits were dialed, the system will determine at step 220 whether extra digits were expected. If extra digits were expected, then the SCP will determine whether the correct amount and type of extra digits were entered at step 200 (i.e., whether the SCP recognizes the digits as a valid PIN). At that point, the operation of the system will follow the same methodology discussed above.

If, on the other hand, extra digits in step 220 were not expected, then the local SSP will play an error message at step 230, and the caller will be disconnected in step 240.

Referring back to step 160, if the calling line identification information does not match a base location (i.e., the call is not originating from a telephone number preloaded into one of the routing tables stored in the SCP), then the subscriber must be calling from a destination OTHER as shown in FIG. 1. Also, currently most mobile telephone services do not provide the telephone number of a calling mobile telephone. Because at this point the SCP is not able to determine which PNCS subscriber is calling, the subscriber must first identify himself or herself in order to update the routing table. Thus at step 250 the system will determine whether extra digits were dialed by the subscriber at step 120. In this situation, the extra digits refer to the personal number of the PNCS subscriber (i.e., the telephone number).

If extra digits were dialed, then at step 290 the SCP will determine whether the extra digits dialed comprise a valid personal number. If it is not a valid personal number, or alternatively if it is determined in step 250 that extra digits were not dialed at all, then at step 260, the local SSP will prompt the caller to dial his or her personal number. At step 270, the SCP will again determine whether the digits entered by the caller comprise a valid personal number. The caller will be given two attempts to enter a valid personal number. If the caller does not enter a valid personal number within the two attempts, the updating attempt will fail, and at step 280, the local SSP will play a message indicating that the personal number has been rejected and the routing table has not been updated. The caller will then be disconnected at step 240.

If, on the other hand, at step 270 or 290 the caller does enter a valid personal number, then at step 300 the local SSP will prompt the caller for his or her unique personal identification number (PIN). At step 310, the SCP will determine whether the caller's response is a valid PIN. The caller will be given two attempts to enter a valid PIN. If the caller does not enter a valid personal number within the two attempts, the updating attempt will fail and steps 280 and 240 will be executed.

If, on the other hand, at step 310 the caller enters a valid PIN, then at step 320, the local SSP will play an acceptance message indicating that the caller's identification has been accepted. At step 330, it is determined whether the SCP needs additional information to process the call. In most cases, the SCP will not need further information and the caller will be disconnected at step 240.

There may be instances, however, in which the SCP needs further information to process the call. For example, if the subscriber is calling from a mobile phone, or from an area without caller ID line information, the SCP will not have the telephone number to which to send the calls. Also, if the subscriber is not calling from a base location, then the system may provide the caller ID line information to the subscriber to verify that it is the correct telephone number. This feature could be provided, for example, in situations where a subscriber's caller identification line telephone number is different from his or her general incoming telephone number.

Thus, at step 330, it is determined whether the SCP needs more information. If more information is needed, then the SSP at step 350 will play a message requesting that more information be input by the caller. At step 360, it is determined whether the additional information entered by the caller was valid, i.e., whether the caller entered a valid telephone number. If the information entered is not a valid telephone number, then at step 370 the SSP will play an error message, and the caller will be given a second opportunity to enter a valid number. If the caller does not enter a valid number within two attempts, then the updating attempt fails at step 380 and the caller is disconnected at step 240.

If on the other hand, the digits collected by the SCP are valid, then at step 390 the SSP will play an acceptance message. The caller will then be disconnected at step 240.

While the preferred embodiment of the present invention has been described in connection with a personal number communications service, it will be understood and appreciated by those skilled in the art that the methods described herein may also be used to update the routing information for any telephone number that queries an SCP for routing information. For example, even if the subscriber does not have a personal number, the subscriber may wish that incoming calls to his/her office number be forwarded to the subscriber's home, car, or other location when the subscriber is away from the office. If the subscriber dials *41, *43, or *44 from home, car, or other location, respectively, the calls will be routed to the subscriber's home, car, or other location. As in the case with PNCS, if there is insufficient information available, the SCP may ask the subscriber for additional information, such as a PN or PIN. If the subscriber dials *42 from the office, then the calls will no longer be forwarded.

While this invention has been described in detail with particular reference to preferred embodiments thereof, it will be understood that variations and modifications can be effected within the spirit and scope of the invention as described hereinabove and as defined in the appended claims.

I claim:

1. A method for forwarding calls to a line selected by a calling party, said calling party being a subscriber having a telephone number, said method comprising the steps of:

(A) receiving a communication directed to a predetermined number;

(B) obtaining a calling line identification number for said communication;

(C) looking for said calling line identification number in a table to determine said subscriber associated with said calling line identification number;

(D) if there is only one subscriber associated with said calling line identification number, then proceeding to step (G);

(E) otherwise, receiving a personal identification number from said calling party;

(F) determining which subscriber is associated with both said calling line identification number and said personal identification number; and (G) forwarding calls for said subscriber at said telephone number to said line having said calling line identification number.

2. A method for forwarding calls to a line selected by a calling party, said calling party being a subscriber having a telephone number, said method comprising the steps of:

(A) receiving a communication directed to a predetermined number;

(B) obtaining a calling line identification number for said communication:

(C) looking for said calling line identification number in a table to determine said subscriber associated with said calling line identification number;

(D) if there is only one subscriber associated with said calling line identification number, then proceeding to step (H);

(E) otherwise, playing a message to said calling party directing said calling party to enter a personal identification number;

(F) receiving said personal identification number from said calling party;

(G) determining which subscriber is associated with both said calling line identification number and said personal identification number; and (H) forwarding calls for said subscriber at said telephone number to said line having said calling line identification number.

3. A method for forwarding calls to a line selected by a calling party, said calling party being a subscriber having a telephone number, said method comprising the steps of:

(A) receiving a communication directed to a predetermined number;

(B) obtaining a calling line identification number for said communication;

(C) looking for said calling line identification number in a table;

(D) if said calling line identification number is found, then determining said subscriber associated with said calling line identification number, then proceeding to step (G);

(E) otherwise, receiving said telephone number and a personal identification number from said calling party;

(F) determining said subscriber associated with both said telephone number and said personal identification number; and (G) forwarding calls for said subscriber at said telephone number to said line having said calling line identification number.

4. A method for forwarding calls to a line selected by a calling party, said calling party being a subscriber having a telephone number, said method comprising the steps of:

(A) receiving a communication directed to a predetermined number;

(B) obtaining a calling line identification number for said communication;

(C) looking for said calling line identification number in a table;

(D) if said calling line identification number is found, then determining said subscriber associated with said calling line identification number, then proceeding to step (H);

(E) otherwise, playing a message to said calling party directing said calling party to enter said telephone number and a personal identification number;

(F) receiving said telephone number and said personal identification number from said calling party;

(G) determining said subscriber associated with both said telephone number and said personal identification number; and (H) forwarding calls for said subscriber at said telephone number to said line having said calling line identification number.

5. A method for forwarding calls to a line selected by a calling party, said calling party being a subscriber having a telephone number, said method comprising the steps of:

(A) receiving a communication directed to one of a plurality of predetermined numbers;

(B) obtaining a calling line identification number for said communication;

(C) looking for said calling line identification number in a table associated with said one of said predetermined numbers to determine said subscriber associated with said calling line identification number;

(D) if there is only one subscriber associated with said calling line identification number, then proceeding to step (G);

(E) otherwise, receiving a personal identification number from said calling party;

(F) determining which subscriber is associated with both said calling line identification number and said personal identification number; and (G) forwarding calls for said subscriber at said telephone number to said line having said calling line identification number.

6. A method for forwarding calls to a line selected by a calling party, said calling party being a subscriber having a telephone number, said method comprising the steps of:

(A) receiving a communication directed to one of a plurality of predetermined numbers;

(B) obtaining a calling line identification number for said communication;

(C) looking for said calling line identification number in a table associated with said one of said predetermined numbers to determine said subscriber associated with said calling line identification number;

(D) if there is only one subscriber associated with said calling line identification number, then proceeding to step (H);

(E) otherwise, playing a message to said calling party directing said calling party to enter a personal identification number (F) receiving said personal identification number from said calling party;

(G) determining which subscriber is associated with both said calling line identification number and said personal identification number; and (H) forwarding calls for said subscriber at said telephone number to said line having said calling line identification number.

7. A method for forwarding calls to a line selected by a calling party, said calling party being a subscriber having a telephone number, said method comprising the steps of:

(A) receiving a communication directed to one of a plurality of predetermined numbers;

(B) obtaining a calling line identification number for said communication;

(C) looking for said calling line identification number in a table associated with said one of said predetermined numbers to determine said subscriber associated with said calling line identification number;

(D) if said calling line identification number is found, then determining said subscriber associated with said calling line identification number, then proceeding to step (G);

(E) otherwise, receiving said telephone number and a personal identification number from said calling party;

(F) determining said subscriber associated with both said telephone number and said personal identification number; and (G) forwarding calls for said subscriber at said telephone number to said line having said calling line identification number.

8. A method for forwarding calls to a line selected by a calling party, said calling party being a subscriber having a telephone number, said method comprising the steps of:

(A) receiving a communication directed to one of a plurality of predetermined numbers;

(B) obtaining a calling line identification number for said communication;

(C) looking for said calling line identification number in a table associated with said one of said predetermined numbers to determine said subscriber associated with said calling line identification number;

(D) if said calling line identification number is found, then determining said subscriber associated with said calling line identification number, then proceeding to step (H);

(E) otherwise, playing a message to said calling party directing said calling party to enter said telephone number and a personal identification number;

(F) receiving said telephone number and said personal identification number from said calling party;

(G) determining said subscriber associated with both said telephone number and said personal identification number; and (H) forwarding calls for said subscriber at said telephone number to said line having said calling line identification number.

* * * * *